July 9, 1963 — J. H. SMOLEN — 3,096,598
BUBBLE-FORMING FISHING LURE
Filed May 2, 1960
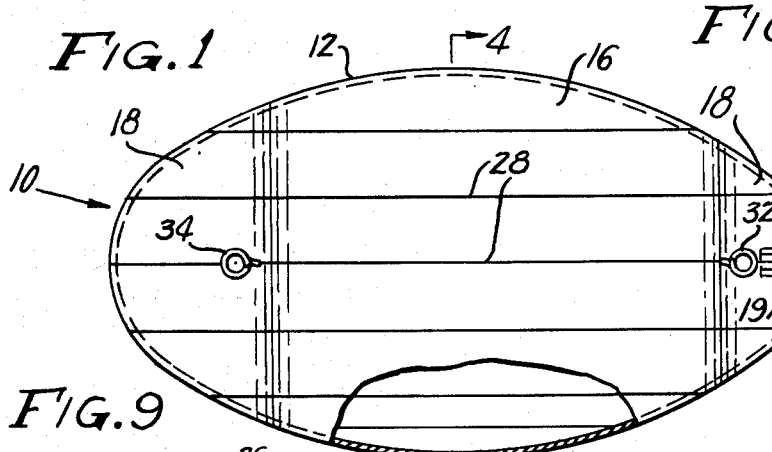
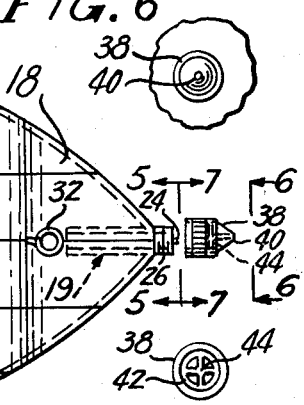
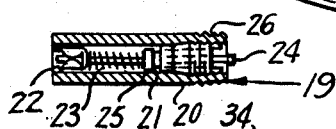
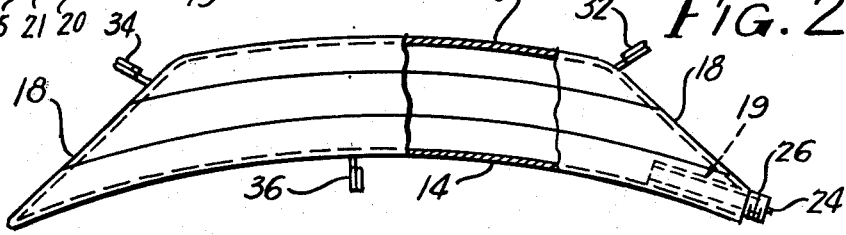
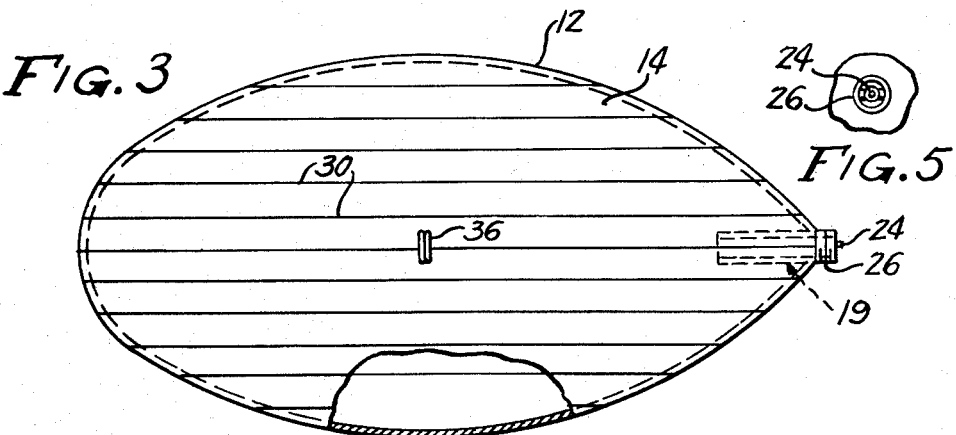
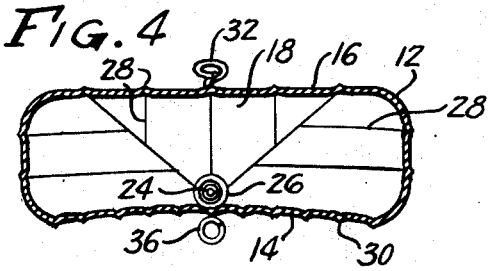
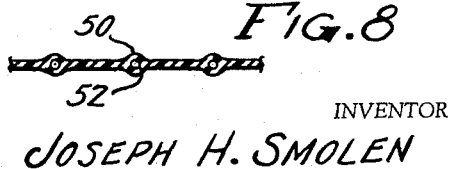
INVENTOR
JOSEPH H. SMOLEN
BY Gustave Miller
ATTORNEY

United States Patent Office 3,096,598
Patented July 9, 1963

3,096,598
BUBBLE-FORMING FISHING LURE
Joseph H. Smolen, 41450 Fret Road, Belleville, Mich.
Filed May 2, 1960, Ser. No. 26,270
1 Claim. (Cl. 43—42.06)

This invention relates to a fishing lure, and it particularly relates to a fishing lure adapted to create air bubbles in the water.

It has heretofore been recognized that fish will be attracted by air bubbles from a lure as the lure moves through the water. This attraction is due to the fact that the bubbles appear to come from a living air-breathing creature such as an insect or the like.

In order to obtain the desired bubble-forming effects, many attempts were heretofore made to utilize escaping gases, such as air, carbon dioxide or the like, from the lure. These attempts usually consisted of providing gas-forming pellets within the hollow lure to react with the water to form the gases or providing small openings in the lure to permit escape of natural air. However, the use of chemical pellets was expensive and often inexpedient since when the store of pellets was exhausted at the fishing site there was no way in which to replenish them immediately. On the other hand, the use of air holes for the escape of atmospheric air was inefficient and seldom provided the desired effect.

It is one object of the present invention to overcome the above mentioned difficulties by providing a bubble-forming lure which requires no solid chemicals and which is effective for its purposes at all times.

Another object of the present invention is to provide a lure of the aforesaid type which is simple in construction and easy to use.

Other objects of the present invention are to provide a fishing lure, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawing in which:

FIG. 1 is a top plan view, partly exploded, of a lure embodying the present invention, the lure being shown partly broken away in section.

FIG. 2 is a side elevational view, partly broken away in section, of the lure of FIG. 1.

FIG. 3 is a bottom view, partly broken away in section, of the lure of FIG. 1.

FIG. 4 is a sectional view taken on line 4—4 of FIG. 1.

FIG. 5 is an end view taken on line 5—5 of FIG. 1.

FIG. 6 is an end view taken on line 6—6 of FIG. 1.

FIG. 7 is an end view taken on line 7—7 of FIG. 1.

FIG. 8 is a fragmentary sectional view of the wall of a modified form of the invention.

FIG. 9 is a longitudinal section of the valve.

Referring in greate detail to the figures of the drawing wherein similar reference characters refer to similar parts, there is shown a fishing lure, generally designated 10, comprising a hollow body 12 which is substantially oval in outline when viewed from the top or bottom but is concave on the bottom, as at 14 and convex on the top, as at 16, when viewed in side elevation (as in FIG. 2). The top is also somewhat smaller than the bottom and is connected to it by oppositely disposed sloping end portions 18.

The central portion of the body 12 is generally rectangular in cross-section (as seen in FIG. 4) while at one end, within the body, there is provided a valve assembly 19. This valve assembly comprises a cylindrical housing or valve chamber 20 having a hole therein with a stem valve 24 extending through the housing and having a valve head 25 adapted to close a valve seat 21 leading to the hole. The valve stem 24 itself is of the standard variety as commonly used in automobile or bicycle tires and tubes wherein a spring 23 abutting bosses 22 urges the valve head 25 into closing position against valve seat 21.

The end of the valve stem 24 is indicated where it extends out of the body 12 through an externally threaded collar 26 on valve housing 20 fixed through the body 12. When the end of the stem valve 24 projects freely, as in FIGS. 1, 2 and 3, the valve head 25 is in closed position with the spring 23 urging the head 25 of the valve 24 against the valve seat 21 while simultaneously urging the valve 24 outwardly of the body 12. When the end 24 is pressed inwardly, it opens the valve. The head 25 of the valve stem 24 mates with the complementary valve seat 21 in the ordinary manner. This permits variation of the flow through the valve depending on the position of the valve relative to the valve seat.

In order to open the valve, it is merely necessary to push in on the end of valve 24, the further it is pushed in, the wider the valve opening and the greater the amount of gaseous fluid such as compressed air expelled. This is also the manner of filling the body 12 with compressed air or the like, this being accomplished by connecting the threaded end of an air hose leading from a compressed air tank, a small bicycle hand pump or the like to the threaded collar 26 which pushes the valve end 24 in for pumping air therethrough in the usual manner.

The body 12 is preferably constructed of metal or high impact plastic and is longitudinally corrugated as at 28 and 30 for added strength. Adjacent the ends of top wall 16 there is provided an eyelet 32 and an eyelet 34 to serve for attaching the fishing line. An eyelet 36 is provided at the center of the bottom wall 14 to serve as a swivel for a fish hook. Additional fish hook eyelets may be provided as desired.

In order to provide for slow release of compressed air or the like from within the body 12 and in order to provide for variation of the amount of air released, there is provided a camming cap 38 having a cylindrical portion which is internally threaded to threadedly engage with the externally threaded collar 26 and a conical portion extending therefrom. The conical portion of the cap 38 is provided with a central opening 40 while the cylindrical portion is provided with a spider 42 having a central disc 44.

After the lure body has been filled with compressed air or the like, it is prepared for forming bubbles by applying the cap 38 to the collar 26. Then, when the cap 38 is so applied and then turned a sufficient amount, the disc 44 contacts the end of valve stem 24 and pushes it in. This opens the valve in proportion to the rotation of the cap 36 and permits the air to flow through the spider and out of the opening 40 in the cap. The valve will be more or less opened in accordance with the extent to which the cap 38 is rotated on the threaded collar 26. The further the cap is turned, the more the valve will be opened. Since in all cases, however, the valve opening will remain relatively small, the air will only come out of the lure slowly but sufficient to form the desired bubbles. When the pressure is exhausted, it may be readily restored by using a small bicycle hand pump, easily carried with the fishing gear.

The rotatable cap 38 plus the push in valve in effect provides a needle valve, as the rate of pressure leakage depends on the amount of rotation of the cap 38 to cam inwardly against the valve stem 24.

In FIG. 8 there is shown a modified form of the device wherein instead of corrugations, the plastic body is provided with ribs 50 in which are embedded wires 52. This type of structure is exceedingly strong.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

A readily repressurable bubble forming fishing lure for slowly emitting gas to form fish luring bubbles comprising a hollow rigid body having fishing line and fish hook connecting means secured thereon and having an opening at one portion of its peripheral extent, a charging and discharging valve assembly within said body at said opening, said valve assembly comprising a valve chamber, a valve seat, and a valve within said chamber, said valve being axially movable toward and away from a closed position on said valve seat, said valve having an end portion extending through the opening in said body, a collar on the exterior surface of said valve chamber and extending through the opening in said body, said end portion of said valve extending through said collar, said valve being yieldably biased into its closed position and being movable into open position by axial pressure on its end portion, and a cap rotatably cammed on said collar, said cap having an aperture therein and having an internal spider, said spider being arranged to apply pressure to said valve end portion when said cap is rotated on said collar, said collar being externally threaded while said cap is internally threaded to mate with the threads on said collar, said cap being constructed to vary its pressure on the valve end portion in accordance with the threadedly adjustable position of said cap on said collar, said cap being temporarily removable to permit access of a charging conduit to the valve.

References Cited in the file of this patent

UNITED STATES PATENTS

| | | |
|---|---|---|
| 549,603 | Jeffery | Nov. 12, 1895 |
| 1,082,232 | Nielsen | Dec. 23, 1913 |
| 1,270,641 | Martin et al. | June 25, 1918 |
| 2,320,145 | La Due | May 25, 1943 |
| 2,410,682 | Richardson | Nov. 5, 1946 |
| 2,503,607 | Arff | Apr. 11, 1950 |
| 2,676,729 | Neville et al. | Apr. 27, 1954 |
| 2,711,264 | Benson | June 21, 1955 |
| 2,854,776 | Van Sant | Oct. 7, 1958 |
| 2,899,103 | Ebert | Aug. 11, 1959 |
| 2,968,886 | Cotroumpas | Jan. 24, 1961 |